Oct. 5, 1965     T. E. HAYES     3,210,492
PRECIPITATION DETECTOR
Filed May 9, 1962     2 Sheets-Sheet 1
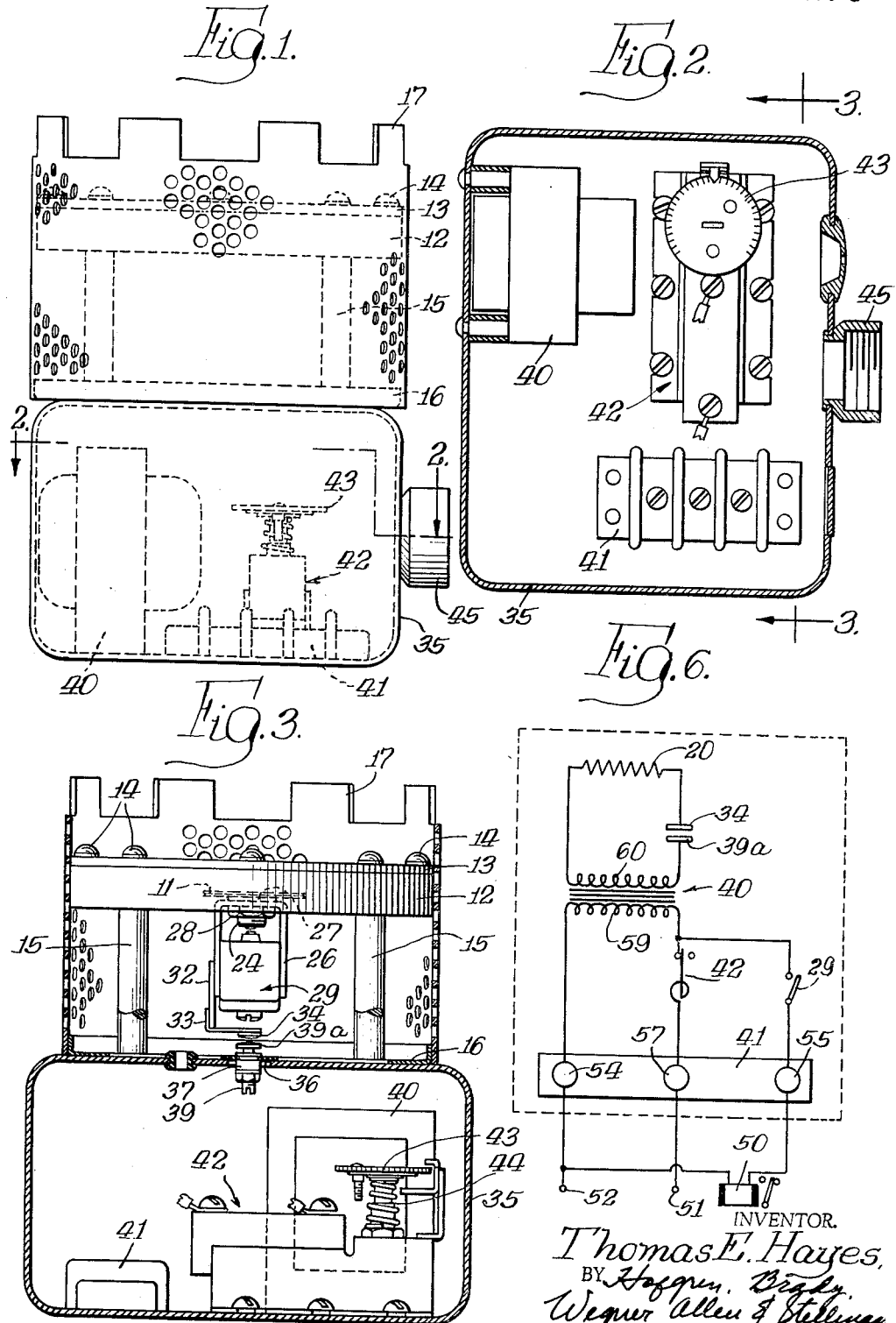

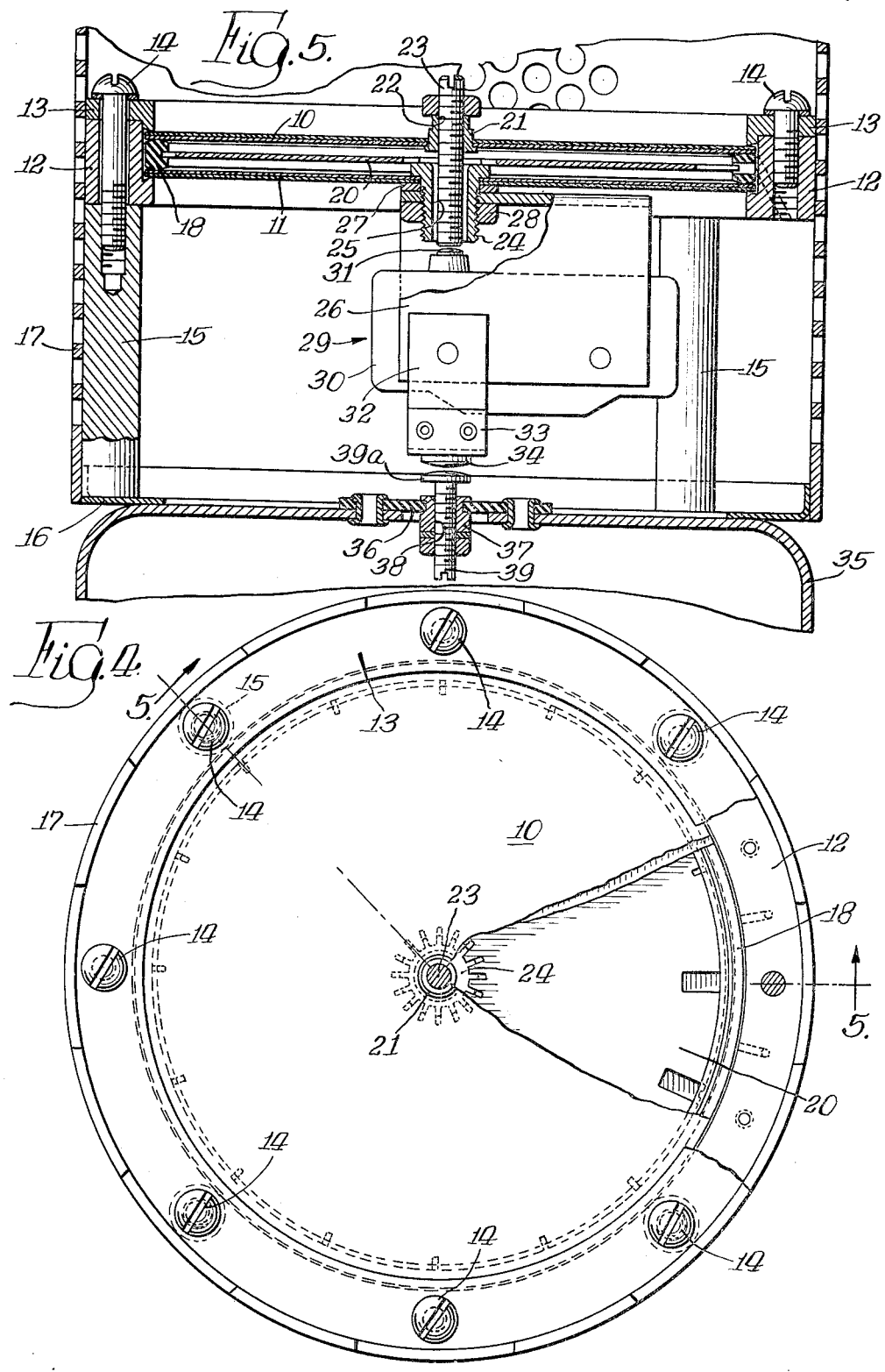

United States Patent Office 3,210,492
Patented Oct. 5, 1965

3,210,492
PRECIPITATION DETECTOR
Thomas E. Hayes, Goshen, Ind., assignor to Penn Controls, Inc., a corporation of Indiana
Filed May 9, 1962, Ser. No. 193,423
9 Claims. (Cl. 200—61.04)

The present invention relates to a precipitation detector and more particularly to a precipitation detector which will detect precipitation not only in the form of rain droplets but also in the form of sleet and snow.

Although a number of precipitation detectors have been devised in the past for detecting the presence of rain droplets, these have not been satisfactory for also reliably detecting the presence of precipitation either in the form of sleet or snow. The present invention provides for the first time a universal precipitation detector which will reliably indicate the presence of precipitation in any form or combination of forms. In addition, it will operate at below freezing temperatures, thus overcoming a disadvantage found in many prior detectors.

It is, therefore, an object of the present invention to provide a new and improved precipitation detector.

A further object is to place a pair of bimetal elements in close proximity to each other with one exposed to falling precipitation of all forms such as rain, snow and sleet and the other one shielded from such exposure, a base of a switch connected to one bimetal element and an actuator of the switch connected to the other bimetal element so that changes in ambient temperature will cause said base and said actuator to move substantially the same distances and in the same direction to prevent a switching action.

An additional object is to provide a heating element in close proximity to the aforementioned pair of bimetal elements whereby the temperature of the bimetal elements is elevated above the ambient temperature of the surrounding atmosphere.

An additional object is to provide a switch attached to at least one of said bimetal elements whereby an electrical circuit, including the aforementioned heating element, is activated whenever the temperature of the bimetal elements falls below a given temperature level and is deactivated when their temperature exceeds a predetermined temperature level.

Yet another object of the present invention is to provide a circuit for operating warming or de-icing equipment, which is adapted to be connected with the aforementioned switch having its base connected to one bimetal element and its actuator connected to the other bimetal element.

Further objects and advantages will become apparent from the following detailed description taken in connection with the accompanying drawings, in which:

FIG. 1 is a front elevational view of an embodiment of the present invention;

FIG. 2 is a sectional drawing of the embodiment of the invention shown in FIG. 1 taken along the line 2—2;

FIG. 3 is a sectional view of the invention shown in FIG. 2 taken along the line 3—3;

FIG. 4 is a partially broken-away top elevational view of the embodiment of the invention shown in FIGS. 1, 2 and 3;

FIG. 5 is a sectional view of the embodiment of the invention shown in FIG. 4 taken along the line 5—5; and FIG. 6 is a circuit diagram of the embodiment of the invention as shown in FIGS. 1–5.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Precipitation detectors used in the past have been devices which have been able to detect precipitation in the form of water or rain droplets and have been rather unsuccessful where sleet, snow or small frozen ice crystals are falling upon an area. This is due to the fact that often precipitation in these frozen forms will not wet a detection element or will form a frozen film over it without activating it to indicate the presence of precipitation. The present invention overcomes this difficulty by providing a detection element which is heated to convert any frozen form of precipitation into water and to set up an evaporation process by which the detector operates.

In addition to its ability to detect forms of frozen precipitation, the present invention provides a device which will be activated whenever the first drops of precipitation impinge upon it.

Referring first to FIGS. 1, 3, 4 and 5, a pair of bimetal elements in the form of bimetal discs 10 and 11 are secured between mounting ring members 12 and 13 by a set of bolts 14 which pass through the ring members into a set of support spacers 15. The spacers 15 are secured to a base member 16 and engage the inner surface of an apertured cylinder 17 which is secured to the base 16. The two bimetal discs 10 and 11 are separated by an electrically non-conductive mounting ring 18 which supports an electrical resistance heating element 20.

A protective enclosure is provided for the bimetal disc 11, by the disc 10, the rings 12 and 13, the apertured cylinder 17 and the base 16 so that falling precipitation will not contact it. A sleeve 21 having a threaded aperture 22 to receive an adjustment screw 23 is secured to bimetal disc 10. A sleeve 24, having an aperture 25 which allows the adjustment screw 23 to freely pass therethrough is secured to the bimetal element 11, to a switch mounting member 26, and to a washer 27 by a nut 28. A positive action switch generally indicated at 29 such as disclosed by United States Letters Patent 2,789,173, issued Apr. 16, 1957, to O. H. Kaminky, having a base 30 and an actuating plunger 31 is secured to the mounting member 26 so that the lower end of adjustment screw 23 may come in contact with the actuating plunger 31. As is customary in such positive action switches, the plunger 31 is operably connected to one electrical contact while the base 30 is operably connected to a cooperative circuit contact. An electrically non-conductive mounting member 32 is secured to the mounting bracket 26 as may be clearly seen in FIGS. 3 and 5. An electrical contact arm 33, constructed of electrically conductive material, is secured to the non-conductive member 32 and has a contact 34 secured thereto.

The base member 16 and an insulating strip 36 are secured to the housing 35. A sleeve 37 is secured in the center of the strip 36 and the housing 35 is apertured to allow the sleeve to pass therethrough without electrical contact. The sleeve 37 has an internally threaded aperture 38 to receive a screw 39 which has a contact 39a secured to one end thereof.

Referring now more particularly to FIGS. 1, 2 and 3, the lower housing 35 contains and has rigidly mounted therein a transformer 40, a terminal board 41, and a thermostatic switch generally indicated at 42 which includes an adjustment dial 43 secured on a shaft 44. A fitting 45 is secured in the housing 35 to provide access for external wiring or cable which connects to the terminal board 41.

The electrical elements thus far described are connected as shown in the circuit diagram of FIG. 4. One end of a relay coil 50 is connected to a terminal 52 of a source of alternating electric current (not shown) and to a terminal 54 on the terminal board 41. The other end is connected to a terminal 55 on the terminal board 41. Another terminal 51 of the source of alternating current is connected to a terminal 57 on the board 41. A primary coil 59 of the transformer 40 is connected in series with the thermostatic switch 42 across the terminals 54 and 57 so that as the ambient temperature falls, a circuit will be completed through the primary coil 59 when the atmospheric temperature has dropped to the temperature level indicated by the setting of the adjusting disc 43 on the thermostatic switch 42. Energization of primary coil 59 will energize a secondary coil 60 of the transformer 40 to cause a current to flow in the heater 20 until the bimetal disc 11 has flexed upward at its center to break contacts 34 and 39a. Referring again to FIG. 5, the setting of the adjustment screw 39 determines the temperature at which the contacts 34 and 39a will open and, therefore, the temperature at which the bimetal elements will be maintained. A satisfatcory operating temperature for the bimetal disc has been found to be 150° F.

The positive action switch 29 is connected to one side of the alternating current source through the switch 42 so that it cannot be activated unless the temperature falls below the predetermined temperature set by the adjustment dial 43. When the positive action switch 29 is closed, a circuit is completed between the terminals 51 and 52 of the alternating current source and the relay coil 50 to place in operation external melting equipment (not shown). Closure of switch 29 occurs only when precipitation forms on the bimetal disc 10, is melted by the 150° temperature and evaporates, cooling the disc 10 which becomes less flexed, carrying the adjustment screw 23 down against the plunger 31. Since the bimetal disc 11 cannot be contacted by the precipitation, it does not experience any evaporatory cooling and, therefore, does not lose whatever flexure it has obtained by being heated to the predetermined temperature of 150°.

Since bimetal element 11 carries the switch 29 with it, the actuating plunger 31 will maintain the same relationship to the base 30 as the temperature of the bimetal element varies while being subjected to either atmospheric temperature or the artificial heating of the heater 20 without precipitation falling. The circuit shown in FIG. 6 and described herein is adapted for a precipitation detector which is to be utilized for energizing melting equipment only when the outside temperature falls to a predetermined low value which is usually set near the freezing temperature of water. Since the switch 42 does not close until freezing temperatures are reached, neither the heater 20 nor the external melting equipment can be energized even though there is a closed circuit between contacts 34 and 39a and the switch 29 is closed.

As will be quickly noted by those skilled in the art, the precipitation detector described herein could be used for higher temperature applications without use of the thermostatic switch 42 or without use of a heater 20. Assuming that the ambient temperature is 70° F. to 90° F., and the precipitation detector is to be utilized to operate the automatic closure of windows when precipitation first falls without heater 20 being energized, precipitation falling upon the exposed bimetal disc 10 would cause it to lose some of its flexure and thereby actuate the switch 29 through movement of the adjustment screw 23. However, even in such relatively warm temperature applications of this invention, it has been found desirable to heat the bimetal element to approximately 150° F., so that a more easily discernible movement of the adjustment screw 23 is produced by the removal of flexure from the bimetal disc 10 when it is being cooled by evaporation. Therefore, detection of precipitation by evaporation of an exposed bimetal element, which is being compared to a sheltered bimetal element both with and without the aid of a temperature elevating heater, is within the scope of the present invention.

I claim:

1. A precipitation detector comprising:
   a first temperature sensitive element,
   means for supporting said first temperature sensitive element in a position exposed to potential precipitation and exposed to ambient atmospheric temperature,
   a second temperature sensitive element,
   means for supporting said second temperature sensitive element in a position sheltered from potential precipitation and exposed to ambient atmospheric temperature, and
   a switch having a pair of cooperating circuit contacts, each contact operatively connected to a different one of said temperature sensitive elements for actuation by one of said elements.

2. In combination with the precipitation detector of claim 1, a heating means mounted in close proximity to said temperature sensitive elements to heat the elements to a temperature which exceeds the temperature of the ambient atmosphere.

3. A precipitation detector comprising:
   mounting means,
   a precipitation exposed bimetal element flexuously supported by said mounting means,
   a precipitation sheltered bimetal element flexuously supported by said mounting means in close proximity to said first element, and
   a switch having a pair of cooperating circuit contacts, each contact operatively connected to a different one of said bimetal elements for actuation by one of said bimetal elements.

4. In combination with the precipitation detector of claim 3, a heating means mounted adjacent said bimetal elements and capable of maintaining said bimetal elements at a substantially constant elevated temperature whenever said exposed element is not cooled by evaporation.

5. A precipitation detector comprising:
   a support structure,
   a precipitation exposed bimetal element flexuously supported at its extremity by said structure,
   a precipitation sheltered bimetal element flexuously supported at its extremity by said structure in close proximity to said first element,
   an electrical resistance heater mounted in said support structure between said bimetal elements, and
   a positive action switch having a pair of cooperating circuit contacts, each contact operatively connected to a different one of said bimetal elements for actuation by one of said bimetal elements.

6. In combination with precipitation detector specified in claim 5, a thermostatic switch connected in series with said heater.

7. The precipitation detector specified in claim 5, wherein at least one bimetal element is a bimetal disc.

8. The precipitation detector specified in claim 5, wherein both said bimetal elements are bimetal discs.

9. In combination with the precipitation detector specified in claim 5, another switch for energizing said resistance heater when the temperature of the bimetal elements falls below a predetermined level and composed of an electrical contact mounted on said support structure and co-operating electrical contact carried by said sheltered bimetal element and spaced from said contact mounted on the support structure in the direction of flexure of said bimetal elements.

References Cited by the Examiner
UNITED STATES PATENTS

| | | | |
|---|---|---|---|
| 1,945,100 | 1/34 | Troll | 340—234 |
| 2,207,422 | 7/40 | Vaughan et al. | 200—138 X |
| 2,373,856 | 4/45 | Smith | 200—140 |
| 2,769,879 | 11/56 | Steiner | 200—138 |
| 2,916,586 | 12/59 | Kuhn | 200—138 X |
| 2,922,981 | 1/60 | Anderson | 340—234 X |

BERNARD A. GILHEANY, *Primary Examiner.*
JOHN P. BEAUCHAMP, *Examiner.*